United States Patent [19]

Forward

[11] 4,352,481
[45] Oct. 5, 1982

[54] APPARATUS AND METHOD FOR ELECTRONIC DAMPING OF RESONANCES

[75] Inventor: Robert L. Forward, Oxnard, Calif.

[73] Assignee: Hughes Aircraft Company, Culver City, Calif.

[21] Appl. No.: 129,861

[22] Filed: Mar. 13, 1980

[51] Int. Cl.³ .......................................... F16M 13/00
[52] U.S. Cl. .................................... 248/550; 74/5.5
[58] Field of Search .............. 248/179, 183, 184, 550; 74/5.5; 33/326

[56] References Cited

U.S. PATENT DOCUMENTS

| | | | |
|---|---|---|---|
| 3,606,233 | 9/1971 | Scharton | 248/550 |
| 3,703,999 | 11/1972 | Forys | 248/550 |
| 3,757,093 | 9/1973 | Licata | 33/326 X |
| 4,033,541 | 7/1977 | Malveg | 248/550 |
| 4,179,087 | 12/1979 | Johnson | 248/550 X |
| 4,198,025 | 4/1980 | Lowe | 248/550 |
| 4,270,393 | 6/1981 | Osborne | 74/5.5 X |

FOREIGN PATENT DOCUMENTS

| 2332 | 6/1979 | European Pat. Off. | 248/550 |
|---|---|---|---|
| 5583 | 11/1979 | European Pat. Off. | 248/550 |

*Primary Examiner*—William H. Schultz
*Attorney, Agent, or Firm*—Allen A. Dicke, Jr.; W. H. MacAllister; A. W. Karambelas

[57] ABSTRACT

Gimbal ring 32 has torquer positioner 34 and position detector 36 connected by servo loop 38, 40. Vibration sensor 52 on ring 32 provides ring vibration signals to amplifier shifter 54, 58 and the resultant signals are added to the servo loop at amplifier 40 to damp out the detected vibration.

5 Claims, 13 Drawing Figures

APPARATUS AND METHOD FOR ELECTRONIC DAMPING OF RESONANCES

BACKGROUND

This invention is directed to an apparatus and method for the electronic damping of resonances by sensing resonance vibration in a structure and feeding an appropriately processed damping force back into the structure for damping thereof.

Mechanical structures are used for a number of different purposes including the support of instrumentation equipment, optical elements and the like.

Gimbals fall in this class and are used for supporting optical and other elements in such a way that they may be rotated on one or more axes. When the mechanical gimbal structure has a mechanical resonance it reduces the effectiveness of the equipment mounted thereon. To overcome such resonances, mechanical stiffening of the structure has been common. In other cases, dampening weights attached by critically resilient supports have been employed to absorb and damp the resonance vibration energy of the structure. Vibration is a common problem in gimbal systems that have the torquer drive motor separated from the rate and position sensors by the mechanical structure of the gimbal. If the gimbal is flexible and has one or more resonance modes, then resonant peaks will be seen in the torquer response. If the frequency of the resonance is sufficiently low and the mechanical Q of the structure is high enough, this resonance can be a source of torquer control loop oscillations and sometimes causes loss of loop control. Even if the resonance problem is not sufficiently severe to produce oscillation, it can still have a significant effect on the torquer response. As a result, the speed of response of a torquer control loop is usually limited by the lowest resonant frequency of the gimbal. When mechanical stiffening of the gimbal ring is employed, there are weight and cost penalties as well as penalties in the response time for rotation of the axis. Such gimbals are often supplied with a torquer motor and a position sensor which feeds back position information to the torquer motor driver. Damping of high frequency resonances can be accomplished by inserting a filter in the electronic portion of the torquer loop but this lowers the servo response time.

Efforts have been made to apply piezoelectric transducers to mechanical structures for the damping of resonance vibration therein, but such piezoelectric devices are limited in power and cannot supply enough damping power to be useful. Thus there is need for an adequate solution to this vibration problem.

SUMMARY OF THE INVENTION

In order to aid in the understanding of this invention it can stated in essentially summary form that it is directed to an apparatus and method for electronic damping of resonances in structures which are part a servo positioning loop. The invention teaches the sensing of vibrations in the structures and applying a suitable signal to the servo positioner in addition to the normal positioning signal, with the additional signal being of the proper amplitude and phase to damp the vibrations.

It is thus an object of this invention to control mechanical resonances in a structure in a servo loop by separately sensing the vibrations and adding a suitable signal into the loop to overcome the vibrations. It is another object to provide damping for a servo loop which includes a structure, with a structure positioning motor separate from a structure position sensor wherein vibration in the structure is sensed, the sensed signal is processed and the processed signal is fed into the structure positioning motor to overcome the mechanical resonance vibration. It is a further object to provide an apparatus and method for damping mechanical resonances in gimbals wherein the resonances that put limits on the response speed or cause uncontrollable oscillations are overcome by the damping to improve gimbal response.

Other objects and advantages of this invention will become apparent from the study of the following portion of the specification, the claims and the attached drawings.

DESCRIPTION OF THE PREFERRED EMBODIMENT

Figure 1:
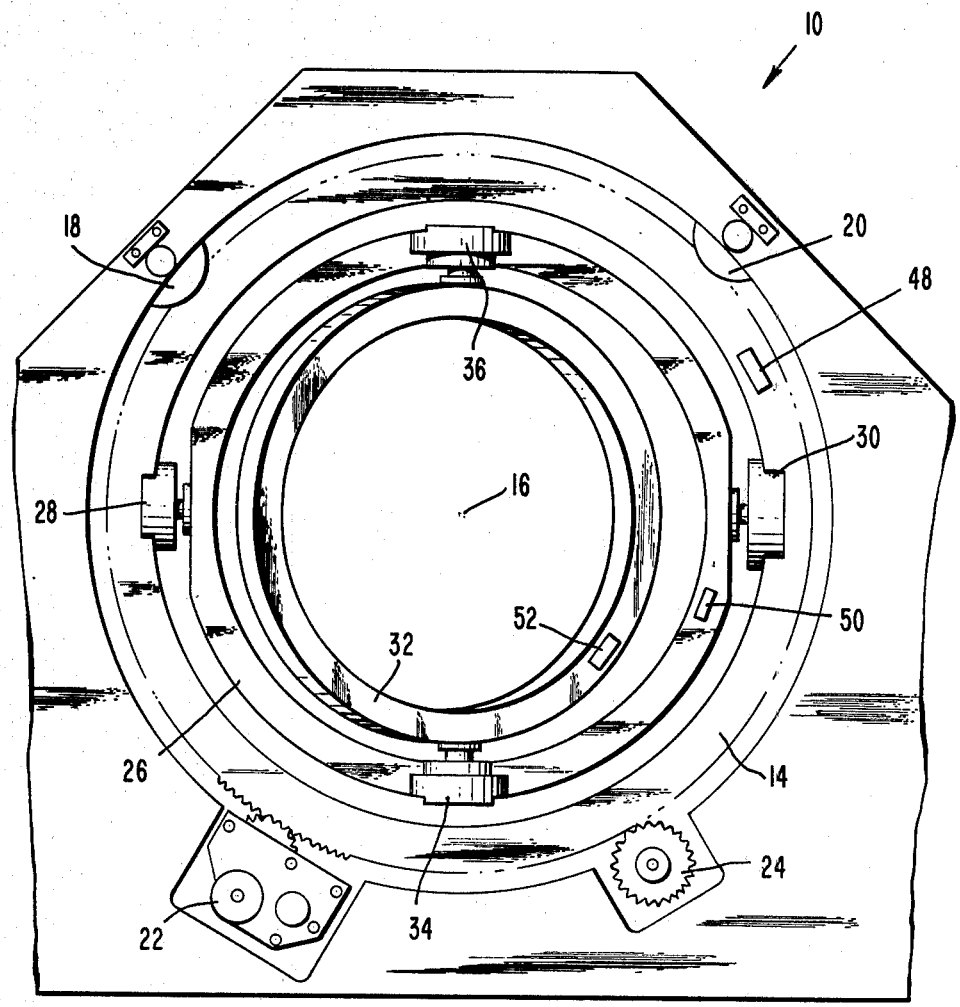
FIG. 1 is a front elevational view of a gimbal having apparatus in association therewith for electronic damping of gimbal resonance.

The electronic damping of resonance in accordance with this invention is demonstrated and applied to a gimbal structure. The gimbal structure 10 is illustrated schematically in FIG. 2, and in FIG. 1 it is shown as having a frame on which outer ring is rotatable on an axis 16 normal to the sheet of FIG. 1. This serves as the first axis. Outer ring 14 is guided by rollers 18 and 20 which are mounted on the frame. Outer ring 14 is driven by drive motor 22 through appropriate gearing.

The rotary position of outer ring 14 is read out by gear driven rate and position sensor 24.

Intermediate ring 26 is supported on outer ring 14 on a rotational axis which passes through drive motor 28 and rate and positioning sensor 30. Both the drive motor and rate and positioning sensor 30 are mounted on outer ring 14. Inner ring 32 is mounted upon a rotational axis which passes through drive motor 34 and rate and position sensor 36, each of which is secured both to intermediate ring 26 and inner ring 32. In the plane of intermediate ring 26, the axis through motor 34 and sensor 36 is at right angles to the axis through motor 28 and sensor 30. By this structure, the inner ring 32, and anything mounted on it, can be rotated on any of three axes.

The torquer drive motor separation from the rate and position sensors by the mechanical structure of the gimbal rings can cause instability problems. If the gimbal ring is flexible and has one or more resonance modes, then resonance peaks will be seen in the torquer motor response. If the frequency of the resonance is low enough this resonance can be a source of torquer motor control loop oscillation and may even result in loss of loop control. Even if the resonance problem is not severe enough to produce oscillation, it can be still have a significant effect on the torquer response. The mechanical resonance problems of such gimbal structures are usually attacked by mechanical solutions, such as stiffening the structure, decreasing the inertia, or by applying resonant or nonresonant dampers. If improvements or corrections were made in the electronic part of the circuit, it usually took the form of a low pass filter which blocked out the high frequency resonances. This, however, lowered the speed of response of the servo loop.

This invention is directed to the detection of vibration and applying signals proportional to the vibration to the fedback damping loop of the gimbal torquer motor to accomplish damping.

Figure 2:
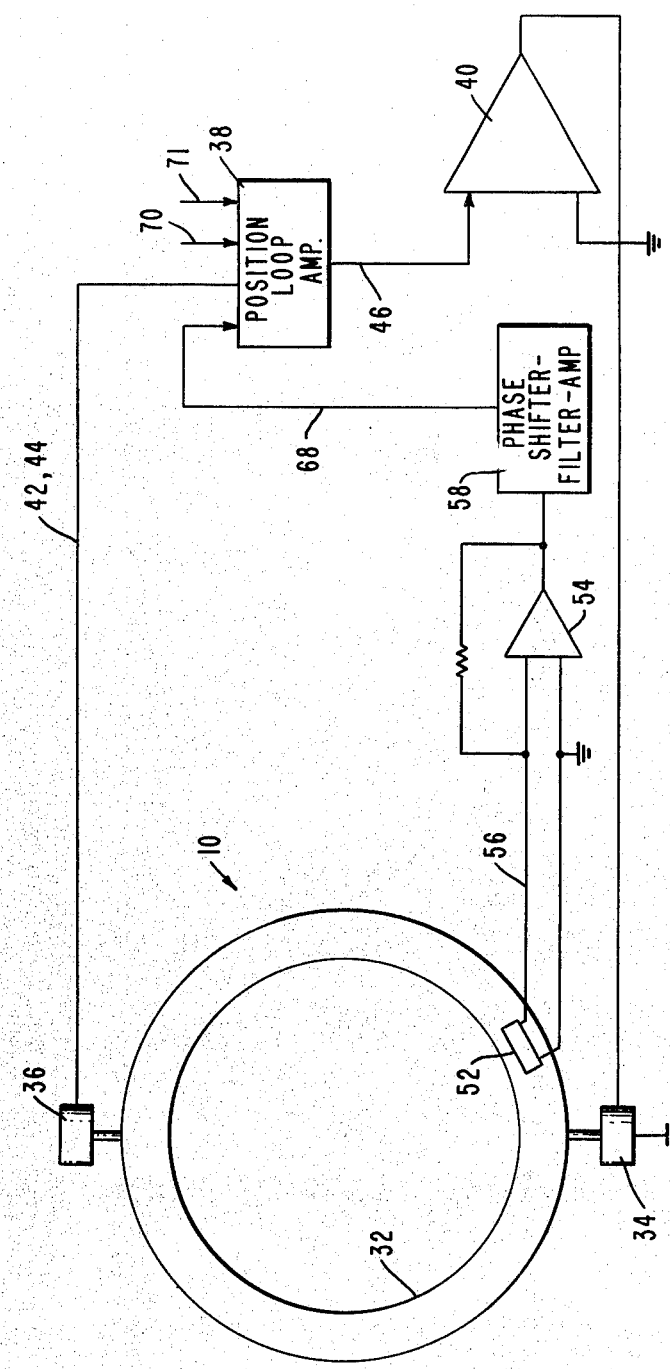
FIG. 2 is an electrical schematic drawing showing the gimbal drive servo loop and the damping apparatus in accordance with this invention.

FIG. 2 schematically illustrates the inner gimbal ring 32 together with its rate and position sensor 36, gimbal ring torquer motor 34 and the servo loop interconnecting them. The servo loop is schematically illustrated at 38 and includes output summing amplifier 40 which receives signals from servo loop 38 and other sources to feed torque drive motor 34.

Figure 3:
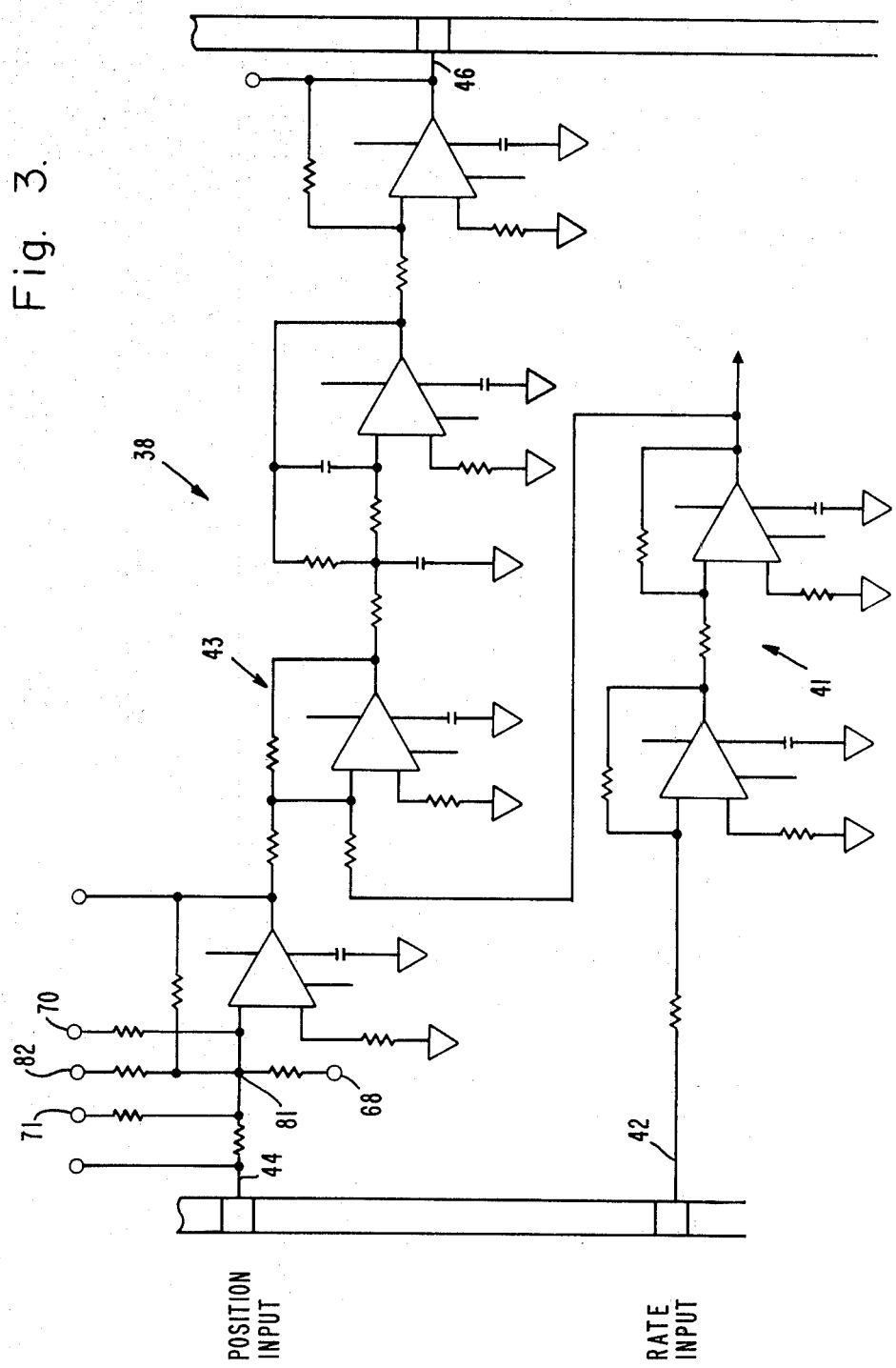
FIG. 3 is an electrical schematic diagram of a position loop amplifier in the gimbal torquer servo loop.

FIG. 3 is a schematic diagram of the rate and position loop amplifier in the azimuth torquer loop shown in FIG. 2. An azimuth rate signal is received in line 42 and an azimuth position signal is received in line 44 from rate and position senor 36. The input points 68, 70, and 71 receive as needed the phase shifted and amplified signals from the various transducers 48, 50, and 52. The rate of signal is amplified at 41. The signals are supplied to multifeed low-pass filter and are processed so that amplifier 38 provides signal filtering, bandwith control and signal amplitude limitation to produce a signal in line 46 to feed power amplifier 40, see FIG. 2. The azimuth servo loop illustrated in FIGS. 2 and 3 is duplicated for each of the other two loops, with the other two loops being suitably adjusted for different values in view of the different masses being driven.

It is thus seen that each of the gimbal rings is positioned and stabilized by control loops. These loops sense the position and angular rate of the gimbals with resolvers and drive the gimbal rings with torquer motors. When an elastic mechanical system, such as a gimbal ring, is torqued from its equilibrium configuration, small initial displacements will cause the structure to develop internal restoring forces that are proportional to the displacements. The motion of the structure will produce damping forces that are proportional to the velocities of the mechanical elements. In mechanical systems, the sign of the damping constant is such that the damping forces always oppose the driving forces. If the driving force has a frequency that is very near one of the natural frequencies of the mechanical system and if the damping is constant is low, then the vibration can build up over a long period. In gimbal systems, these vibrational resonances can cause oscillations in the torquer control loops and can even lead to failure of the mechanical elements.

In accordance with this invention the vibration in the gimbal ring is sensed, the signal processed and added into servo loop so that the servo loop itself has superimposed on the normal loop signals, signals which are appropriate in phase, frequency and amplitude to damp the vibrations. Thus combined servo loop and vibration damping signal is fed to the final amplifier 40 and then to the torquer motor 34, see FIG. 2.

At three places on the gimbal structure 10, see FIG. 1, Gulton SC-3 piezoelectric ceramic strain transducers were attached as vibration sensors. These three sensors are indicated at 48, 50 and 52. Transducer 48 is located on the outer roll gimbal ring 14. Transducer 50 is located on the middle elevation gimbal ring 26 near the end with the resolver 30, where the twisting strains are at a maximum. Transducer 52 is located on the inner azimuth gimbal ring 32 near the end with resolver 34 at a maximum strain point.

Figure 4:
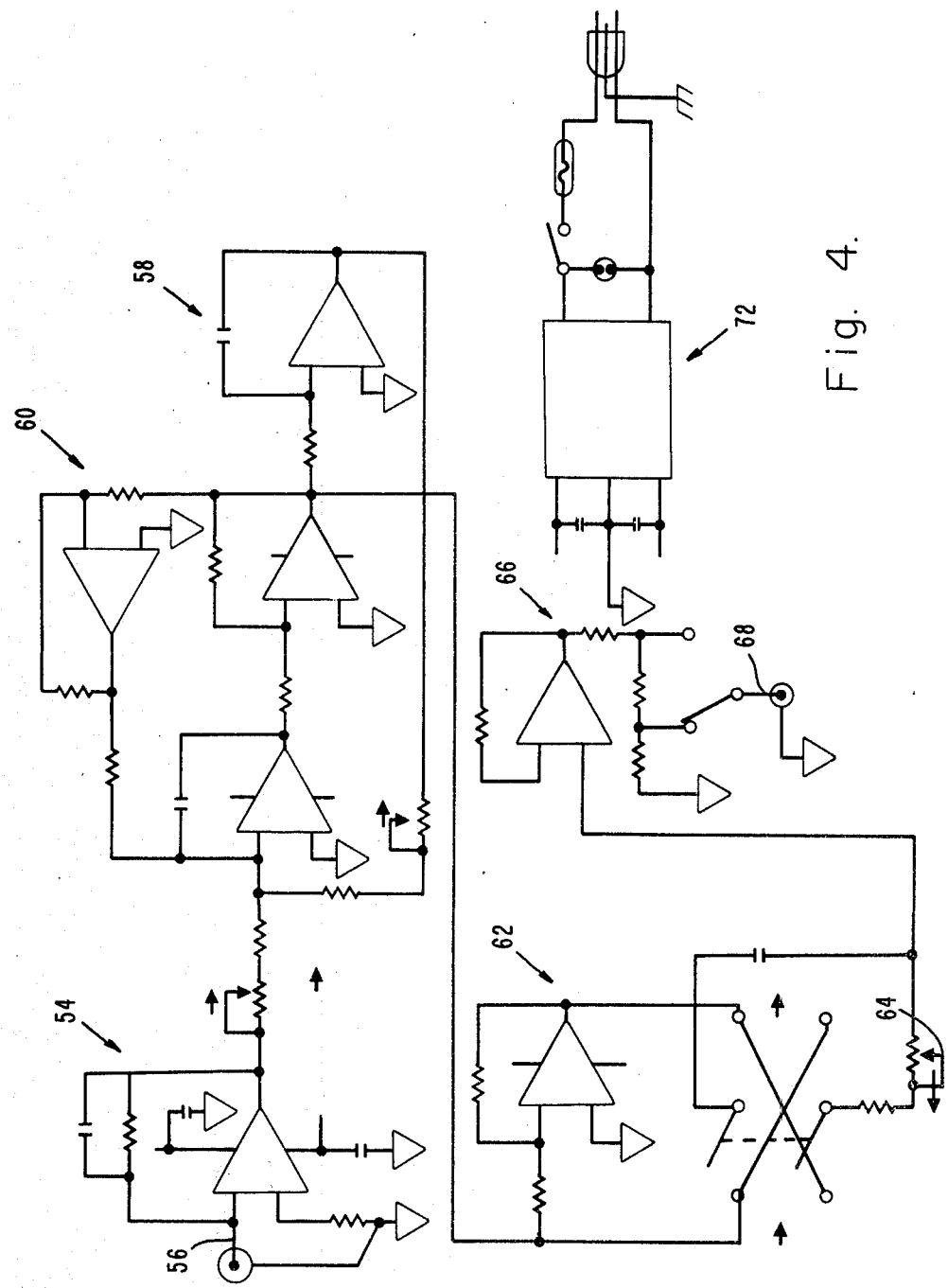
FIG. 4 is a schematic electric diagram of an electronic damping circuit containing a preamplifier, bandpass filter and phase shifter.

Each of the transducers 48, 50 and 52 produces at its output a signal which must be appropriately processed and added to the servo loop. Amplifier 54 receives the signal from transducer 52 through line 56. Amplifier 54 is a first stage charge amplifier which converts the charge of transducer 52 into a voltage. As seen in FIG. 4, the signal from amplifier 54 is fed into filter-amplifier-phase shifter 58 which has filter section 60 and phase shifter 62 which is controlled by potentiometer 64. Final gain is controlled by final signal amplifier stage 66 which has an output signal in line 68. As seen in FIG. 2, the line 68 feeds that signal to input point 68 in FIG. 3, which is connected to the input tie point 81 through an isolating resistor.

In addition to the servo loop signals, other signals are also fed to input tie point 81 of the position loop amplifier 38. Since the mechanical structure between the gimbal ring is somewhat rigid, vibrations in one ring are sensed in another. Therefore the processed signals from selected of the transducers, suitably filtered and phase shifted and adjusted for amplitude are fed from the selected transducers into selected servo loops. Line 70 is a line which provides phase shifted and amplitude controlled signals from transducers 48 and 50 to the azimuth or inner gimbal ring 32 servo loop illustrated in FIG. 2. Additional input lines 71 can be connected to tie point 81 through isolating resistors as needed. Similarly, the output of phase shifter 58 in line 68 is fed to appropriate input lines in the elevation and roll gimbal servo loops. Power supply 72 supplies the power to the signal processor comprised of amplifier 54 and amplifier phase shifter 58 illustrated in FIGS. 2 and 4. It also supplies the power to the servo loop signal processors of which the azimuth servo loop signal processor is illustrated in FIG. 3.

Figure 5:
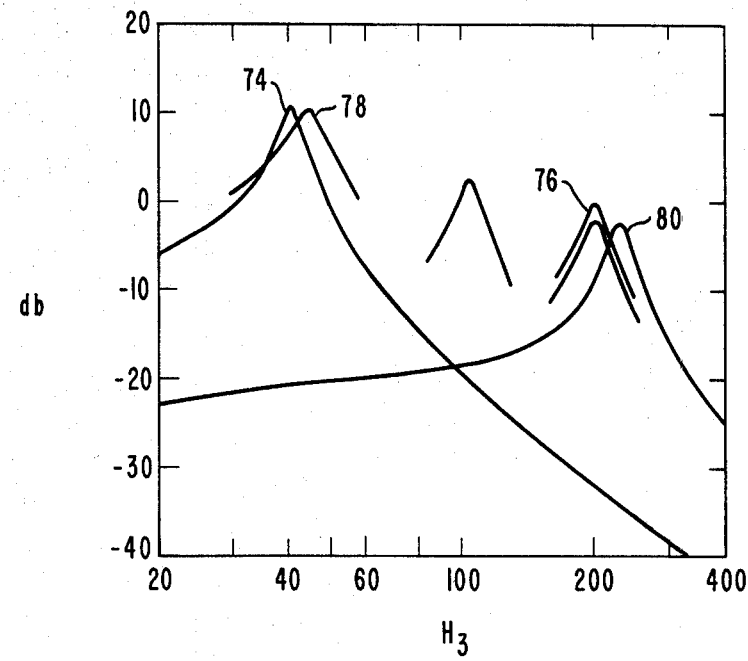
FIG. 5 is a graph of transfer function amplitude in decibels versus frequency in Hertz of the filter characteristics of the electronic damping circuits.

FIG. 5 illustrates the gain characteristics of the gimbal electronic damping circuits. Each of the circuits comprises the circuit of FIG. 4 with a current input front end, successively followed by narrow band amplifiers tuned to selected frequencies, phase shift circuits and low impedance output. The feedback loop system peaks 74 and 76 were sensed at vibration sensor 50 on the elevation gimbal and appeared in the elevation torquer loop. Peak 78 was sensed on roll transducer 48 and appeared in the azimuth servo loop 38. Peak 80 and another one at 510 hertz were sensed by transducer 52 on the azimuth gimbal and appeared in the azimuth servo loop illustrated in FIG. 2.

Figure 6:
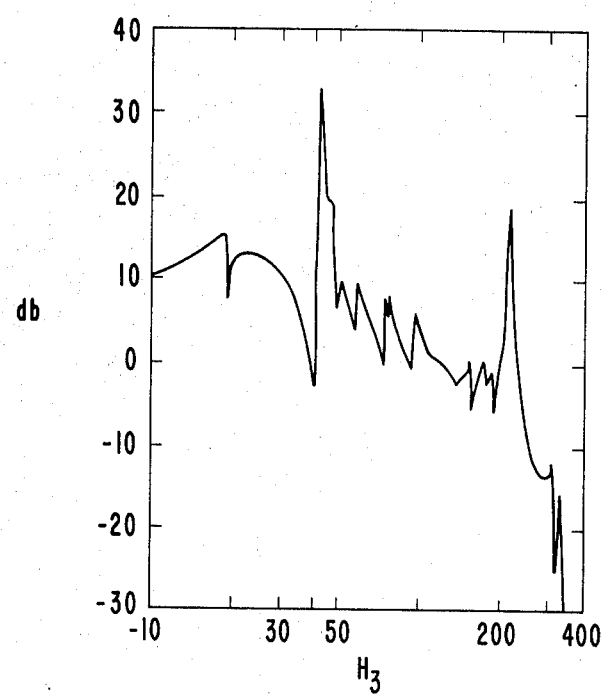
FIG. 6 is a graph of the transfer function amplitude in decibels versus frequency in Hertz of the response of transducer 50 to azimuth torquer excitation.
Figure 7:
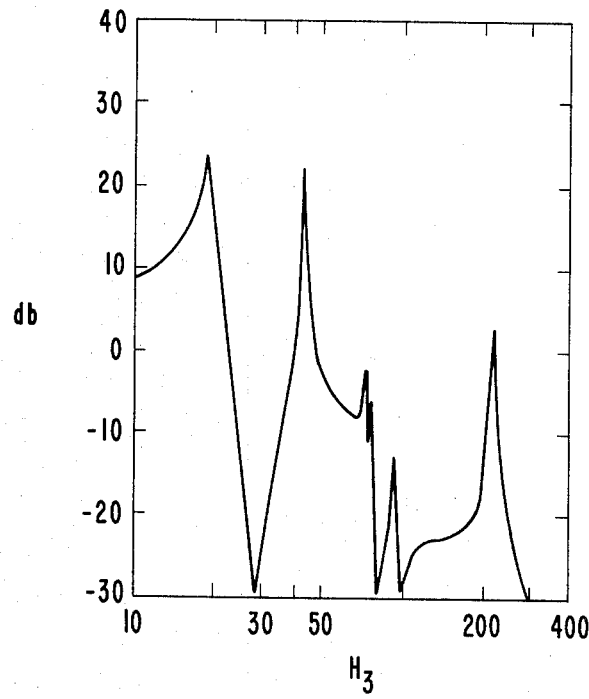
FIG. 7 is a graph of the transfer function amplitude in decibels verus frequency in Hertz of the response of transducer 50 to elevation torquer excitation.
Figure 8:
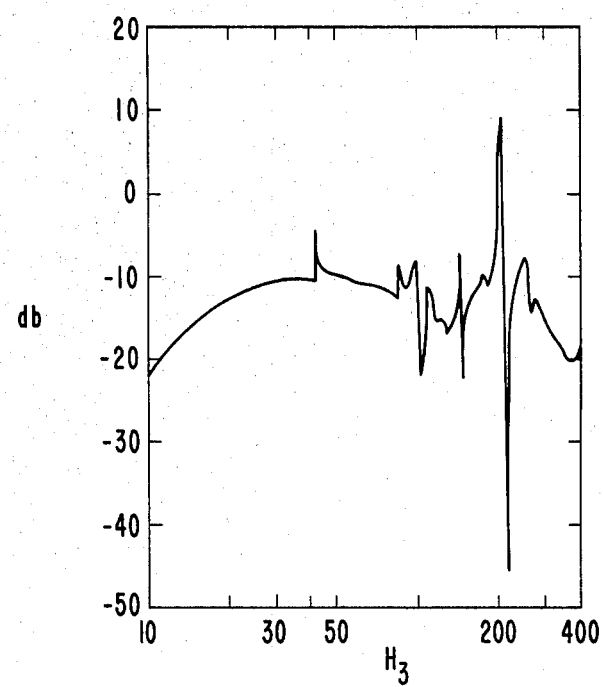
FIG. 8 is a graph of transfer function amplitude in decibels versus frequency in Hertz of the response of transducer 52 to azimuth torquer excitation.
Figure 9:
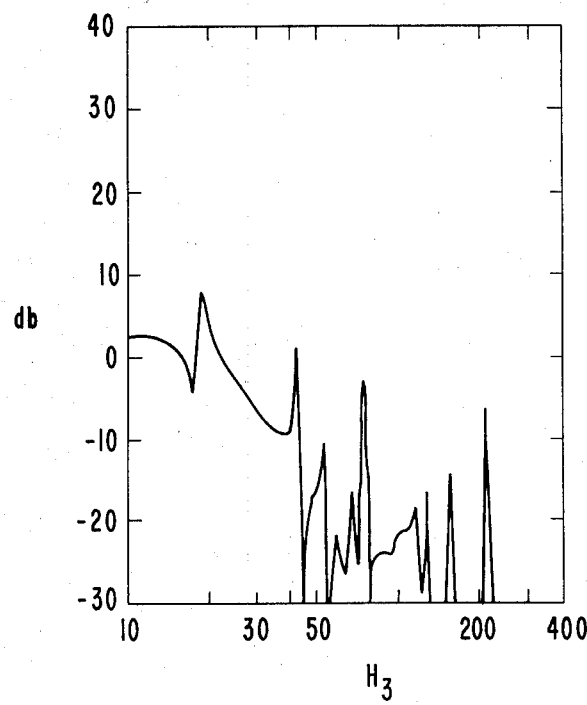
FIG. 9 is a graph of transfer function amplitude in decibels versus frequency in Hertz of the response of transducer 52 to elevation torquer excitation.
Figure 10:
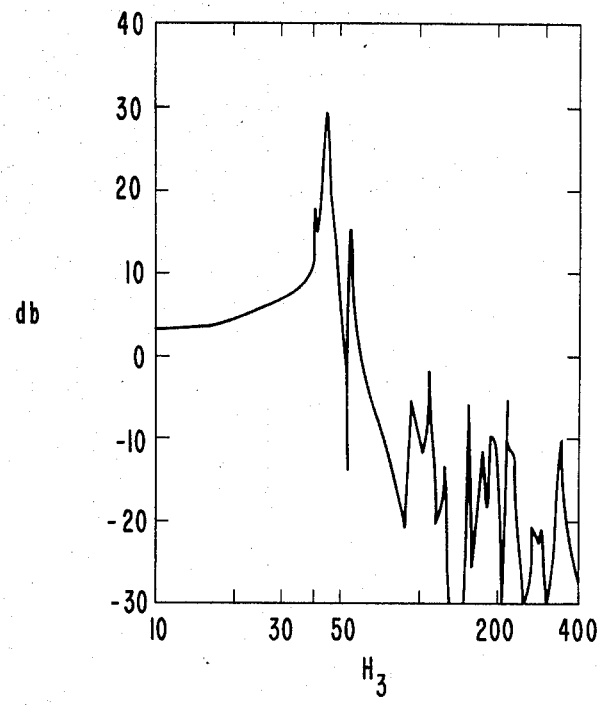
FIG. 10 is a graph of transfer function amplitude in decibels versus frequency in Hertz of the reponse of transducer 48 to azimuth torquer excitation.
Figure 11:
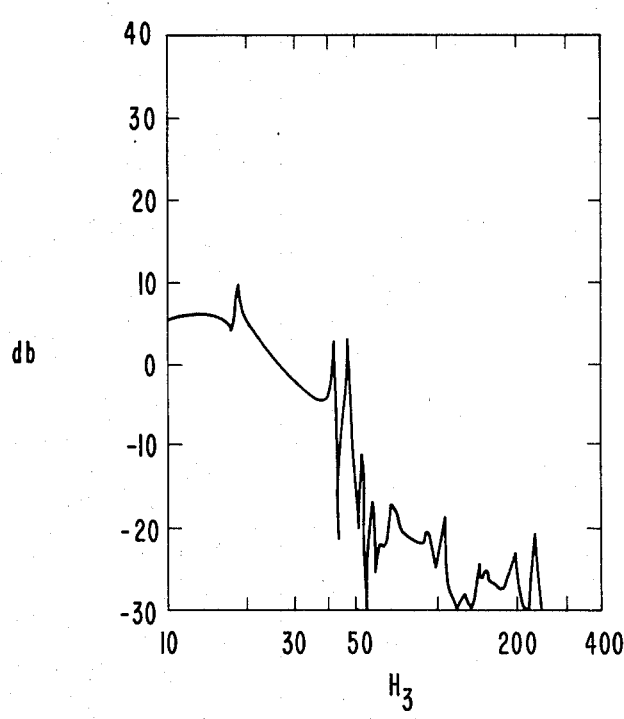
FIG. 11 is a graph of transfer function amplitude in decibels versus frequency in Hertz of the response of transducer 48 to elevation torquer amplitude.

The system was checked for the response of the transducers as a result of excitation of the structure. The structure was excited by applying a frequency controlled signal to the test point 82 of the servo loop amplifier illustrated in FIG. 3. FIG. 6 shows the sensed vibration at elevation transducer 50 when excitation was provided into the torquer servo loop which drives the azimuth drive motor 34. The significant responses to the azimuth torquer excitation were at 44 and 213 Hertz, but the 44 Hertz response was modified by the 48 hertz response. In FIG. 7, the vibration sensed by transducer 50 on the elevation intermediate gimbal ring 26 is charted showing the vibration sensed when the variable frequency drive is put into the elevation signal loop. FIG. 8 shows the response of the azimuth inner gimbal ring 32 as seen by sensor 52 to azimuth torquer 34 excitation. FIG. 9 shows the response of the azimuth inner gimbal ring 32 vibration as sensed by transducer 52 to elevation torquer 28 excitation from the variable frequency source. FIG. 10 shows the response of transducer 48 on the outer ring 14 to excitation of the azimuth torquer 34 to variable frequency input to the torquer loop. FIG. 11 shows the response of transducer 48 to excitation of the elevation torquer 28 to the variable frequency test input. These plots show the sensitivity of the transducers to the various vibrational inputs and show strong coupling of the sensor to the structure at resonance. From these relationships, the interconnection between the sensor and the torquer loop to which it is to be applied can be developed. In each structural case, the relationship between sensor and driver will be selected to be most effective.

In the present structure there are three gimbal servo loops, one each for the roll axis, elevation axis and azimuth axis. In addition, there are three vibration sensors 48, 50 and 52 on the gimbal structure. They are respectively located on the three gimbal mechanical members, but more vibration sensing transducers could be employed with several of them on each of the mechanical members to detect vibration at different locations, or at different vibration nodes. With the three vibration sensing transducers disclosed, and with the three servo loops, there are nine possible feedback loops to feed the servo loops. Furthermore, as illustrated in FIGS. 6-10, there are different resonant peaks. The FIG. 4 amplifier for each of the feedback loops is a narrow band amplifier tuned to a particular resonant band. Thus, a particular resonant mode must be selected and the vibration feedback loop turned to that mode frequency.

Figure 12:
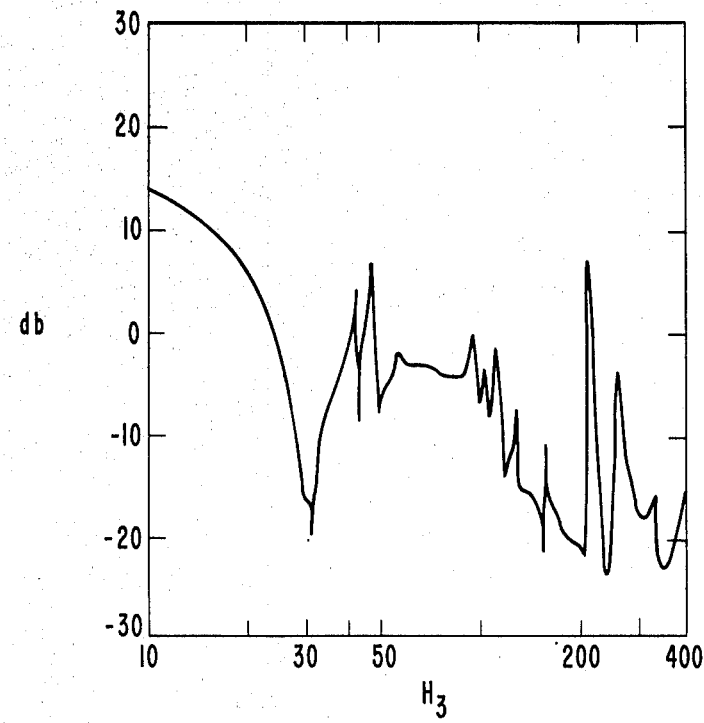
FIG. 12 is a graph of transfer function amplitude in decibels versus frequency in Hertz of the gimbal elevation torquer control of response without electronic damping.
Figure 13:
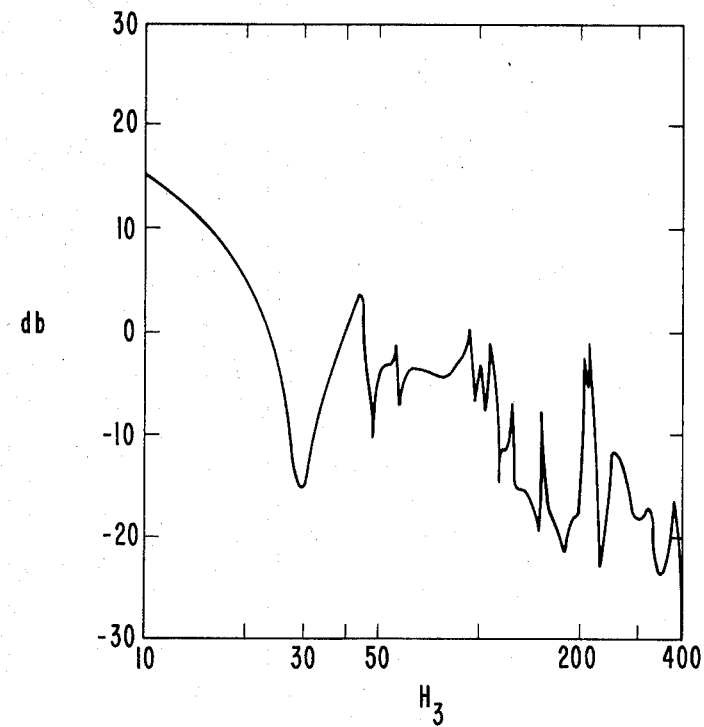
FIG. 13 is a graph similar to FIG. 12, but with the electronic damping effective.

In the preferred embodiment illustrated, five feedback loops were selected for damping the vibrations. The output from transducer 50 on the elevation gimbal ring 26 was connected and sent to 2 amplifiers, one of which produced amplification and phase shift at 44 hertz and the other at 213 hertz. The output from the 44 hertz filter amplifier was fed to the elevation torquer 28 servo loop and the output of the 213 hertz filter amplifier was connected to the azimuth gimbal ring 32 torquer control loop. Similarly, transducer 52 on the inner azimuth gimbal ring 32 was coupled through a filter, amplifier, phase shifter circuit as shown in FIG. 4 at 214 hertz and was fed into the elevation torquer control loop. The signal from transducer 52 was also fed through a different filter, amplifier phase shifter circuit arranged to pass the 245 hertz band was fed into the azimuth torquer control loop for damping therein. The final loop selected was the transducer 48 on the roll gimbal ring 14 which was coupled through a filter-amplifier phase shifter at 48 hertz into the azimuth torquer control loop. Of course other frequency modes and other feedback loops could have been selected, but in the preferred embodiment these five feedback loops performed well in damping vibration as indicated in FIGS. 12 and 13. Gains and phase shift were adjusted in all vibration feedback loops and the result is indicated in FIGS. 12 and 13.

FIGS. 12 and 13 show the sensed amplitude verses frequency of the vibration in the azimuth gimbal ring 32 as seen by transducer 52 respectively with the electronic damping turned off, and with the electronic damping of this invention with feedback to the servo loops turned on. There is a significant decrease in the vibrational amplitudes and reduction in the resonance peaks at 44, 48, 213, 214, and 245 Hz. Thus, by sensing of vibrational amplitudes in structures in a servo system and feeding back appropriately processed signals to the servo loop, system vibration can be damped and decreased.

This invention has been described in its presently contemplated best mode and it is clear that it is susceptable to numerous modifications modes and embodiments within the ability of those skilled in the art and without the excerise of the inventive faculty. Accordingly the scope of this invention is defined by the scope of the following claims.

What is claimed is:

1. An apparatus for the damping of resonance in a system comprising:
   a gimbal structure having at least first and second axes and having at least first and second movable mechanical members respectively movable on said first and second axes, a positioner and a resolver connected to each of said first and second movable mechanical members for positioning and determining the position thereof said positioners and said resolvers being electromechanical devices with a mechanical portion thereof connected to said mechanical members, said positioners and said resolvers being positioned away from each other;
   first and second control servo loops respectively connected with said positioner and resolver of said first and second mechanical members; and
   first and second vibration sensing transducers respectively attached to said first and second mechanical members, said first and second vibration sensors being respectively connected to said first and second servo loops for connecting the vibration signals from said vibration sensing transducers into said electronic control servo loop for damping vibration inside said gimble structure, said connection of said transducers to said servo loops including a phase shifter and an amplifier.

2. An apparatus for the damping of resonance in a system comprising:

a gimbal structure having at least first and second axes and having at least first and second movable mechanical members respectively movable on said first and second axes;

a first resolver connected to said first mechanical member for determining the position of said first mechanical member, and a second resolver connected to said second mechanical member for detecting the position of said second mechanical member;

a first positioner connected to said first mechanical member for positioning said first mechanical member and a second positioner connected to said second mechanical member for positioning said second mechanical member;

first and second electronic control servo loops respectively connected between said first resolver and said first positioner, and said second resolver and said second positioner for respectively moving said first and second movable mechanical members toward a desired position, the improvement comprising:

first and second vibrations sensing transducers respectively attached to said first and second movable mechanical members, said first and second vibration sensing transducers being respectively connected to said first and second electronic control servo loops, said first transducer connected to said first mechanical member being also connected to said second servo loop which is connected to said second mechanical member so that there is a vibration cross-over signal between said servo loops.

3. The method of damping vibration in a gimbal structure having a first member and a second member each having a separate axis and each having a positioner to position its member and a resolver to detect the position of its member and each having a separate servo loop connected between its resolver and positioner, comprising the steps of:

separately sensing the vibrations in each of the mechanical members to produce separate vibration signals;

separately phase shifting and amplifying the sensed vibration signals in each of the mechanical members; and combining each phase shifted and amplified mechanical vibration signal into the corresponding electrical servo loop to produce torques in the positioner which tend to dampen the vibrations in the first and second members.

4. The method of damping vibration in a system which includes a first member having a first resolver and a first positioner and movable on a first axis and a second member mounted on the first member and having a second resolver and a second positioner and movable on a second axis together with a first servo loop connected between the first resolver and first positioner and a second servo loop connected between the second resolver and the second positioner, comprising the steps of:

separately sensing vibration in the first and second mechanical members to produce first and second separate vibration signals;

separately amplifying and phase shifting the first and second vibration signals;

combining the amplified and phase shifted first and second vibration signals into the respective first and second servo loops to produce torques in the first and second positioners which tend to dampen the vibrations in the mechanical members; and connecting at least one of the phase shifted and amplified vibration signals to the other loop and combining it therewith.

5. An apparatus for the damping of resonance in a system comprising:

first and second movable mechanical structures, said mechanical structures being connected together, a first resolver connected to said first movable mechanical structure for detecting its position and a first positioner connected to said first mechanical structure for moving said first mechanical structure;

first servo loop connected between said first resolver and said first positioner for moving said first mechanical structure toward a desired position;

a second resolver connected to said second mechanical structure for determining the position of said second mechanical structure and a second positioner connected to said second mechanical structure for moving said second mechanical structure, said second resolver and said second positioner each being connected to said second mechanical structure;

a second servo loop connected between said second resolver and said second positioner for moving said second mechanical structure toward a desired position;

first transducer means connected to said first mechanical structure for sensing vibration in said first mechanical structure and producing vibration signals and first connection means including signal processing means for connecting the vibration signal from said first transducer means into said first servo loop for damping vibration in said first mechanical structure;

second transducer means connected to said second mechanical structure for sensing vibration in said second mechanical structure and producing vibration signals, and second connection means including signal processing means for connecting the second vibration signal from said second transducer means into said second servo loop for damping vibration in said second mechanical structure; and said first transducer means connected to said first mechanical member being also connected to said second servo loop so that there is a vibration cross-over signal between said servo loops.

* * * * *